United States Patent [19]

Steinberg et al.

[11] Patent Number: 5,466,194
[45] Date of Patent: Nov. 14, 1995

[54] JOCKEY WHEEL ASSEMBLY

[75] Inventors: John D. Steinberg; Eric T. Saltzman, both of Huntington Beach, Calif.

[73] Assignee: Bebop Incorporated, Huntington Beach, Calif.

[21] Appl. No.: 267,587

[22] Filed: Jun. 29, 1994

[51] Int. Cl.⁶ .............................. F16H 9/24; F16H 59/00
[52] U.S. Cl. ........................................................... 474/80
[58] Field of Search ................................. 474/70, 80, 81; 475/298; 280/238

[56] References Cited

U.S. PATENT DOCUMENTS

| | | | |
|---|---|---|---|
| 4,058,020 | 11/1977 | Huret et al. | 474/80 |
| 4,286,953 | 9/1981 | Shimano | 474/80 |
| 4,348,198 | 9/1982 | Shimano | 474/80 |
| 4,433,963 | 2/1984 | Shimano | 474/80 |
| 4,575,365 | 3/1986 | Nagano | 474/80 |
| 4,580,327 | 4/1986 | Juy | 474/80 X |
| 4,637,808 | 1/1987 | Nakamura | 474/80 |
| 5,350,339 | 9/1994 | Carmichael | 474/79 |

*Primary Examiner*—Roger J. Schoeppel
*Attorney, Agent, or Firm*—Hawes & Fischer

[57] ABSTRACT

The jockey wheel, intended to be incorporated in the derailleur of a bicycle, permits limited lateral sliding movement of its outer ring gear relative to a central bushing, but requires a rolling bearing between the outer ring gear and the central bushing to rotate by fixing the ring gear to the outer race of the rolling bearing and the bushing to the inner race of the rolling bearing. In one construction, bushings between the inner race and shaft carrying the jockey wheel are keyed to one another to permit only lateral sliding movement. In another construction, the inner race of the rolling bearing is eccentrically shaped to interfit with the bushing, thereby permitting only lateral sliding movement between the eccentrically shaped inner race and bearing but requiring the inner race to rotate with the bushing.

14 Claims, 5 Drawing Sheets

5,466,194

JOCKEY WHEEL ASSEMBLY

FIELD OF INVENTION

The present invention broadly relates to a wheel or pulley construction in a device such as a bicycle derailleur, and more particularly to such a jockey wheel assembly in which the wheel or pulley floats, or is permitted some lateral or axial movement.

BACKGROUND

Virtually all modern bicycles transmit power from the rider's legs to the rear wheel by means of a chain connecting a gear attached to the rider's feet by means of pedals and crankarms to a second gear connected to the rear wheel. Bicycles having more than three possible gear ratios generally include a cluster of different gears at the rear wheel. The rider can choose which gear of the gear cluster the chain will engage by means of a shift lever or other control device. That selection device is attached to a derailleur, which guides the chain to the appropriate gear.

The derailleur generally consists of a pair of small pulleys or jockey wheels located underneath the gear cluster and a means for moving the jockey wheels across the sequence of planes defined by the gear cluster. Because the appropriate length of chain will change depending upon the gear selected, the cage which holds the jockey wheels is attached to the derailleur body by means of a spring, which allows the jockey wheels to hold the chain in relatively constant tension and thereby prevent it from tangling or falling off the gear sprockets.

In traditional derailleur systems, the derailleur is generally attached to the selector mechanism by means of a cable. The cable is generally held in tension by a spring located in the derailleur body and which tends to move the jockey wheel assembly or mechanism towards the outside of the gear cluster. The shifting mechanism uses high internal friction to counter the spring tension in the derailleur and allow the derailleur to remain in the position set by the rider. Such a system is infinitely variable, and requires the rider to acquire considerable skill in order to change gears quickly and reliably.

In the 1980's, Shimano introduced an "indexed" shifting system. This system used a series of detents in the gear shift lever to indicate and hold the precise location of the various rear gears. An audible "click" allowed the rider to easily sense when a gear was selected.

The Shimano-type indexing system requires that the jockey wheels in the rear derailleur be precisely positioned under the appropriate sprocket for each gear. In order to reduce the degree of precision required, Shimano equipped its derailleurs with an upper jockey wheel that was permitted to float laterally by approximately 0.6 millimeter. This float allowed the system to operate despite slight misalignment of the derailleur body due to improper cable tension or other improper adjustment. The jockey wheels used by Shimano all rotate around plain bushings. These bushings generate considerably more friction than bearings with rolling elements, and tend to squeak and make other objectionable noises, particularly if not regularly cleaned and lubricated.

Since their introduction by Shimano, a number of other component manufacturers, including Campagnolo, have introduced indexed shifting systems. All employ a floating jockey wheel using plain bushings.

A number of manufacturers such as Bullseye, Control Tech and Carmichael, have marketed derailleur wheels that include sealed ball bearings. These units generate much less friction than do the stock wheels using plain bearings. However, they do not allow the float that is essential to the proper functioning of the indexed shifting systems. Simply leaving the inner race of the bearing loose on its mounting bolt would be ineffective because of the phenomenon called "stiction" or static friction. The seals that are required in order to protect the rolling elements of the bearing from contamination cause little friction once the bearing has begun to turn, but have high initial friction when they begin to turn after being stationary. If the inner race of the bearing is sufficiently loose on its mounting bolt to allow lateral movement, the stiction in the seals will tend to make the inner race of the bearing rotate relative to the bolt. This makes the assembly function as a plain bearing, and negates the advantages of the rotating elements.

Ideally, a jockey wheel would use a bearing containing rolling elements to reduce friction and allow lateral float for precise shifting. The construction of the jockey wheel would be such as to induce the outer race to rotate relative to the inner race, thereby to ensure that it functions as a roller or ball bearing.

These and other objects of the present invention will be apparent to those skilled in the field from the following detailed description of a preferred embodiment.

BRIEF SUMMARY OF THE INVENTION

The invention relates to a jockey wheel for a bicycle derailleur. The wheel includes, basically, a rolling bearing and a ring gear. The rolling bearing has an inner race (adapted to receive a shaft), an outer race, and rollers between the inner race and outer race. The ring gear has an inner opening sized to receive the outer race of the rolling bearing, and an outer periphery including gear projections shaped to mesh with the drive chain of a bicycle. The gear projections define the plane of the ring gear. First means are provided to attach the ring gear to the outer race of the rolling bearing, and second means are provided for attaching the inner race of the rolling bearing to a shaft. This second means permits longitudinal movement of the inner race relative to the shaft but impedes rotational movement of the inner race relative to the shaft, the plane of the ring gear being transversed to the longitudinal axis of the shaft receiving the jockey wheel.

Preferably the second means, which not only impedes rotational movement of the inner race relative to the shaft but actually prevents rotational movement of the inner race relative to the shaft, includes a pair of bushings, the first bushing having an outer periphery sized to interfit with the inner race of the rolling bearing, the second bushing having an outer periphery sized to be received within the inner periphery of the first bushing. Means are provided, such as by a key way in one bushing and a key in the second bushing, to permit only sliding movement of the bushings relative to one another in a lateral direction, i.e. a direction transverse to the plane of the ring gear. Also, preferably the outer edges of the outer bushing are shaped to clear contaminants from the outer surface of the inner bushing as the outer bushing slides laterally along the inner bushing.

Other features of the jockey wheel are set forth in the detailed description.

BRIEF DESCRIPTION OF THE DRAWINGS

The invention will be further described in connection with the accompanying drawings in which.

DETAILED DESCRIPTION

To adequately fulfill its function, a jockey wheel assembly must be free to move laterally into the plane of the various gears of the gear cluster, thereby achieving and allowing a natural alignment of the bicycle chain with the gear as it moves towards the particular gear of the gear cluster over which it is riding. However, this lateral movement must be restricted, thereby to permit the bicycle rider to move the chain from one gear to an adjacent gear of the cluster. As noted in the background section, these conflicting challenges or requirements have not been adequately met by any of the prior jockey wheel assemblies.

Figure 1:
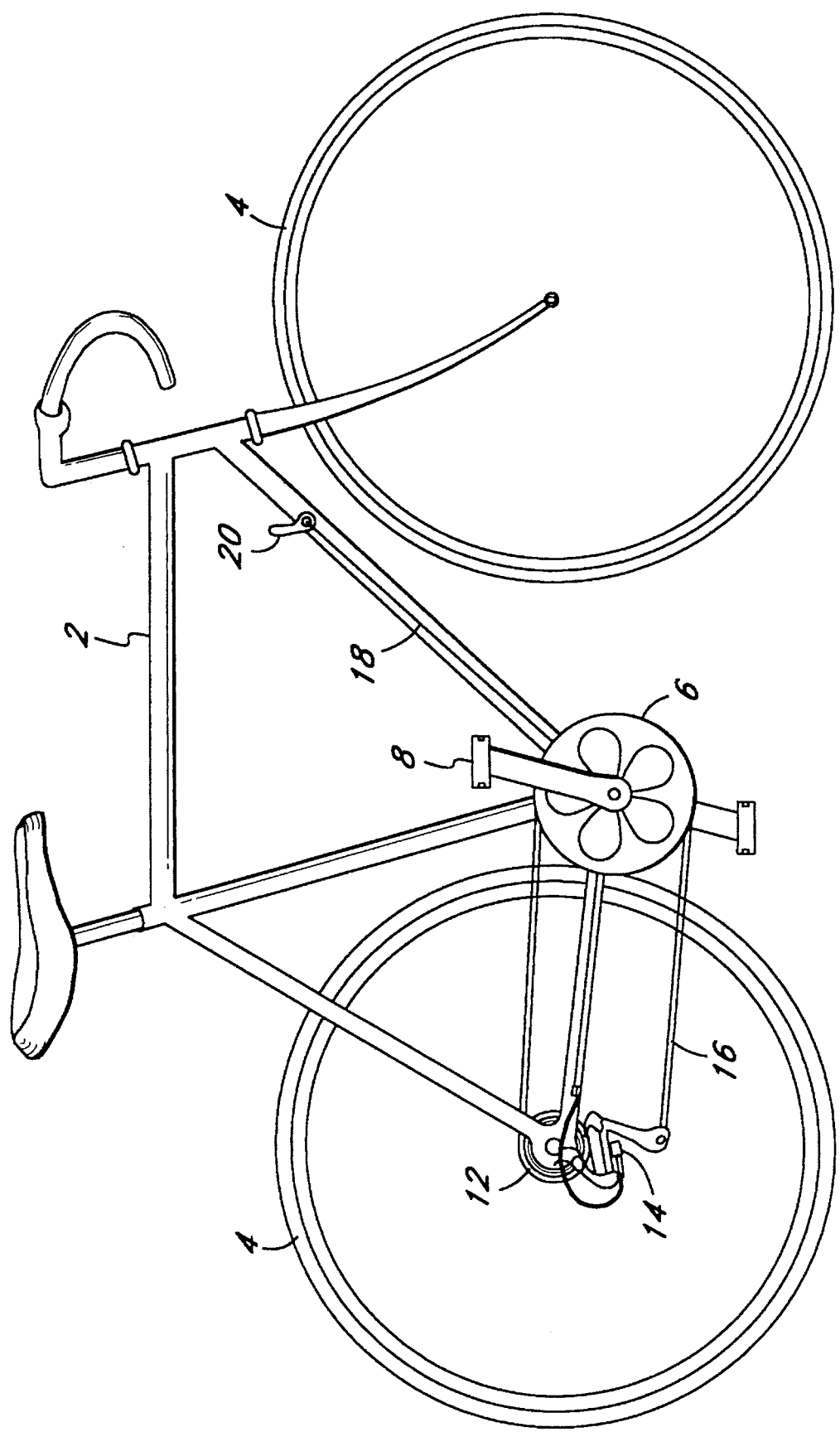
FIG. 1 is a side elevational view of a bicycle having a rear derailleur.

In its preferred form, the jockey wheel assembly of the present invention is employed in a derailleur of a bicycle. As shown in FIG. 1, a typical bicycle construction provides, attached to a frame 2 on which is mounted a pair of wheels 4 and a drive sprocket 6 connected to pedals 8, a gear cluster 12 and a derailleur assembly 14. The derailleur receives chain 16 and guides it to the appropriate gear of gear cluster 12 to provide the desired mechanical ratio between the gear cluster and drive gear 6. A cable 18 connects shift lever 20 to the derailleur assembly 14 to permit the orientation of the derailleur to be adjusted relative to the gear cluster, thereby to shift the chain from one gear of the cluster to an adjacent gear of the cluster, all as is well known in the bicycle field today.

Figure 2:
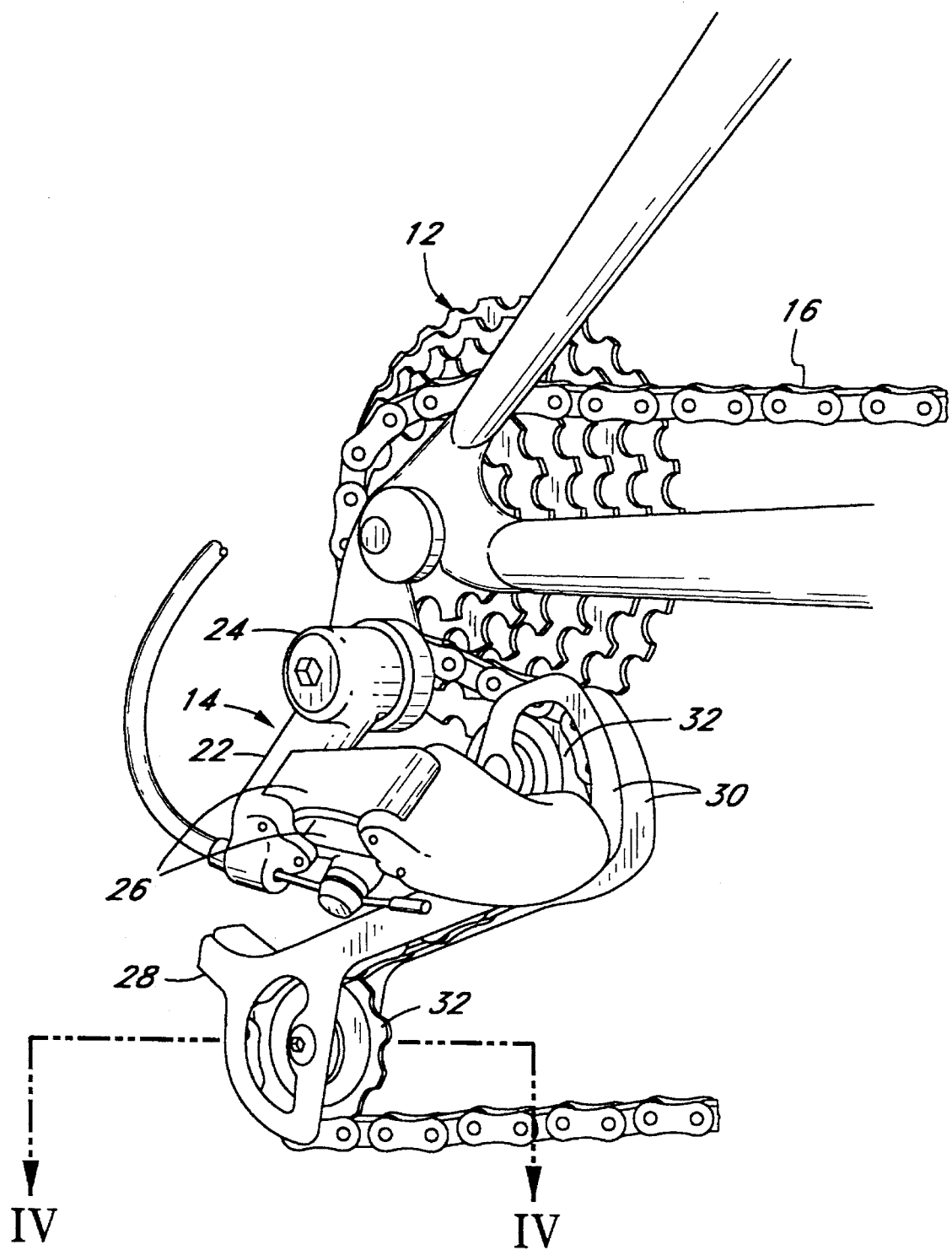
FIG. 2 is a perspective view of the derailleur and gear cluster.

As shown in FIG. 2, the derailleur assembly 14 includes an arm 22 fixed to the bicycle frame 2 by being received on and held to bolt 24 connecting the derailleur to the bicycle frame. Attached to arm 22 by means of a pair of pivoting links or rods 26 is a cage assembly 28 including parallel frames 30 between which are received a pair of jockey wheels 32. Chain 16 rides over these jockey wheels as it passes to one of the gears of gear cluster 12. The cage assembly may be shifted by moving lever 20, to cause links 26 to pivot relative to arm 22 thereby moving the jockey wheels and the chain they carry and guide from one of the gears of gear cluster 12 to an adjacent gear of the gear cluster.

Figure 3:
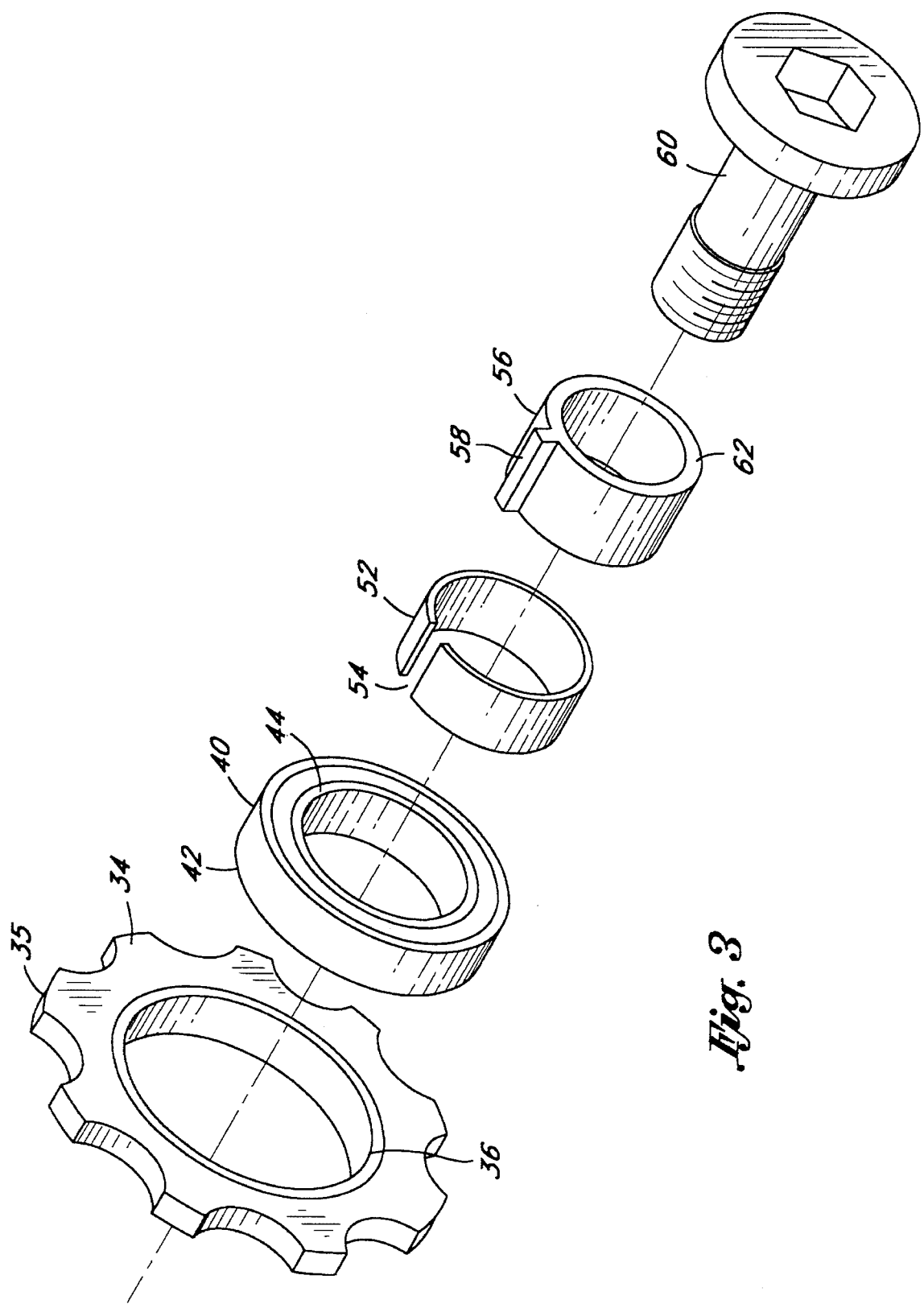
FIG. 3 is an exploded view of certain elements of the jockey wheel of the present invention.
Figure 4:
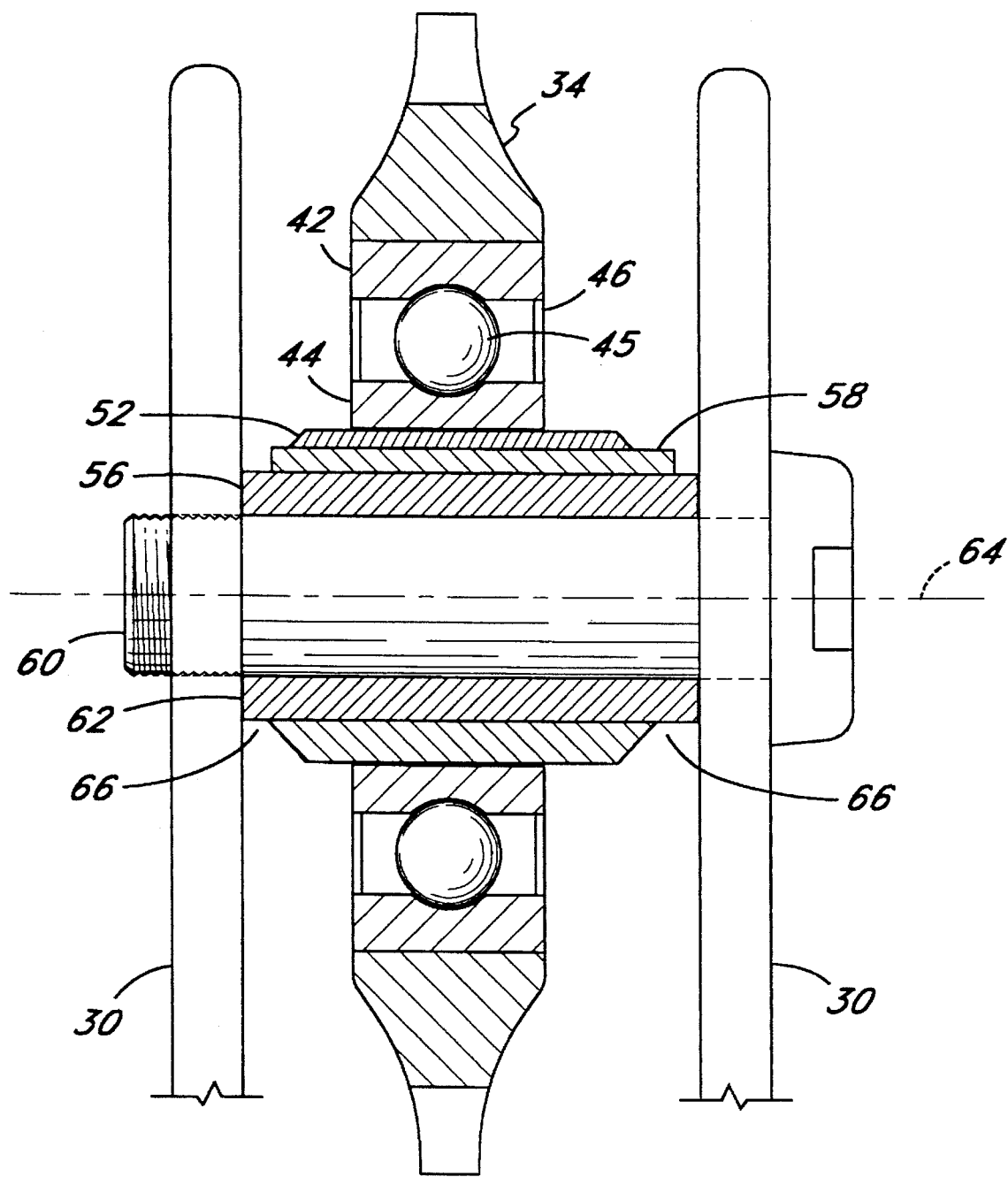
FIG. 4 is a cross-sectional view, taken on lines IV—IV of FIG. 2, of the jockey wheel mounted on a derailleur or cage or frame.

The preferred construction of a jockey wheel made in accordance with the present invention is shown in FIGS. 3 and 4. FIG. 3 is an exploded view of the construction and FIG. 4 is a cross-sectional view taken on lines IV—IV of FIG. 2. In general, as shown in FIG. 3, the jockey wheel has a ring gear 34 carrying about its periphery a plurality of gear teeth or projections 35 shaped to mesh with the drive chain of the bicycle. These gear projections define the plane of the ring gear, that plane being perpendicular to the plane of the sheet presenting FIG. 4, for example. The ring gear includes an inner periphery 36 sized to receive a rolling bearing 40. (This bearing, and the other bearings, may incorporate either balls or rollers as desired; they are generally referred to herein simply as rolling bearings) Rolling bearing 40 includes an outer race 42 and an inner race 44 between which are the balls 45, as shown in FIG. 4. Preferably this rolling bearing is a sealed bearing assembly by virtue of skirts 46 extending between the outer race and inner race, such sealed bearing assemblies being well known. The diameter of the outer race is such that it is snugly received in the inner periphery 36 of ring gear 34. The ring gear may be prevented from turning relative to the outer race of the rolling bearing in any of various ways, such as by being adhesively bonded, press fit or soldered to one another.

A first bushing 52 is snugly received within inner race 44. The first bushing is prevented from turning relative to the inner race of the rolling bearing in any of various ways, such as by being eccentrically shaped, press fit or adhesively bonded or soldered to one another. In this construction, the first bushing includes a slot or keyway 54 that extends parallel to the longitudinal axis of this bushing, the longitudinal axis of the bushing (as well as the rolling bearing and gear) being defined by the axis about which the various cylindrical surfaces of these elements rotate. The first bushing may be made of or coated with a low friction substance such as Teflon or Nylon to encourage axial movement by the first bushing relative to the second bushing.

A second bushing 56 is received within the first bushing. The second bushing includes a key 58 shaped and oriented to be received in keyway 54. The size of the outer periphery of the second bushing 56 is such, with respect to the size of inner periphery of first bushing 52, that the second bushing is loosely received within the first bushing and can laterally slide back and forth along the main longitudinal axis of these two bushings. Also key 58 is sized and shaped such that it will freely slide within keyway 54, thereby permitting these bushings to move relative to one another in the direction of their longitudinal axis. However, because of the inter-fitting relationship of key 58 and keyway 54, the two bushings are prevented from rotating relative to one another.

The second bushing 56 is received on the shaft of bolt 60, this bolt (as shown in FIG. 4) extending between frames 30 of the cage assembly. The shaft of the bolt extends through an opening of one of the frames and is received in a threaded opening in the other frame such that when tightened, the bolt clamps the frames to the opposed outer edges 62 of the second bushing.

By this construction, the second bushing is prevented from rotating relative to the frames 30 of the derailleur cage assembly. However, the first bushing can slide laterally relative to the second bushing in a direction aligned with the main longitudinal axis 64 (FIG. 4) of bolt 60. Rotation of the first bushing relative to the second bushing is prevented by the interfitting relationship between key 58 and keyway 54 of these bushings. As previously stated, inner race 44 is fixed to the outer periphery of the first bushing. Thus, as the chain passes over gear teeth or projections 35 about ring gear 34, causing the ring gear to turn, because that gear is fixed to the outer race 42 of the rolling bearing, the outer race will turn relative to the inner race thereby to overcome the stiction between these two races and cause the rolling bearing to function as a true rolling bearing, thereby minimizing any rotational friction between these elements of the jockey wheel assembly.

During use the various elements of the jockey wheel will tend to pick up a coating of dust and debris. These contaminants will cover, among other things, the outer surface of the second bushing 56. Preferably the ends 66 of the first bushing are tapered or slope outwardly in a direction towards axis 64, as shown in FIG. 4. This sloping tends to assist these edges in cleaning contaminants from the outer surface of the second bushing thereby to prevent these contaminants from increasing the friction between the outer surface of the second bushing and the inner surface of the first bushing, which contaminants would otherwise tend to impede the bushings' sliding movement relative to one another.

Because of the preferred assembly of the jockey wheels 32, the bicycle chain 16 will be permitted to align itself with the plane of the gear of gear cluster 12 on which it is riding even though cage assembly 26 might be displaced somewhat from the plane of that gear. However, as the cage assembly is moved by the bicycle rider, using lever 20, the cage assembly will cause one of the frames 30 to engage an edge of the first bushing 44, thereby to prevent further sliding of the first bushing relative to the second bushing and to force the jockey wheel and the bicycle chain it guides from one of the gears of gear cluster 12 to an adjacent gear of the gear cluster. As the chain moves to an adjacent gear of the cluster, it will tend to deflect the jockey wheels causing the first bushings to slide across the second bushings to engage the opposite frame 30 of the cage assembly. Further movement of the cage assembly will bring the jockey wheels into alignment with the plane defined by the gear over which the bicycle chain is now riding. The precise alignment of the jockey wheels with this gear will be established by the tendency of the bicycle chain to move the jockey wheels to slide along the second bushing until the chain and the guide wheels are precisely aligned with the plane of the gear over which the chain is riding, the first bushing now being in a lateral position partway between the frame of the cage. In this fashion precise alignment of the jockey wheels with each gear of the gear cluster is achieved even though the bicycle rider, or the bicycle mechanic, may not have precisely adjusted cable 18 to achieve this alignment.

Figure 5:
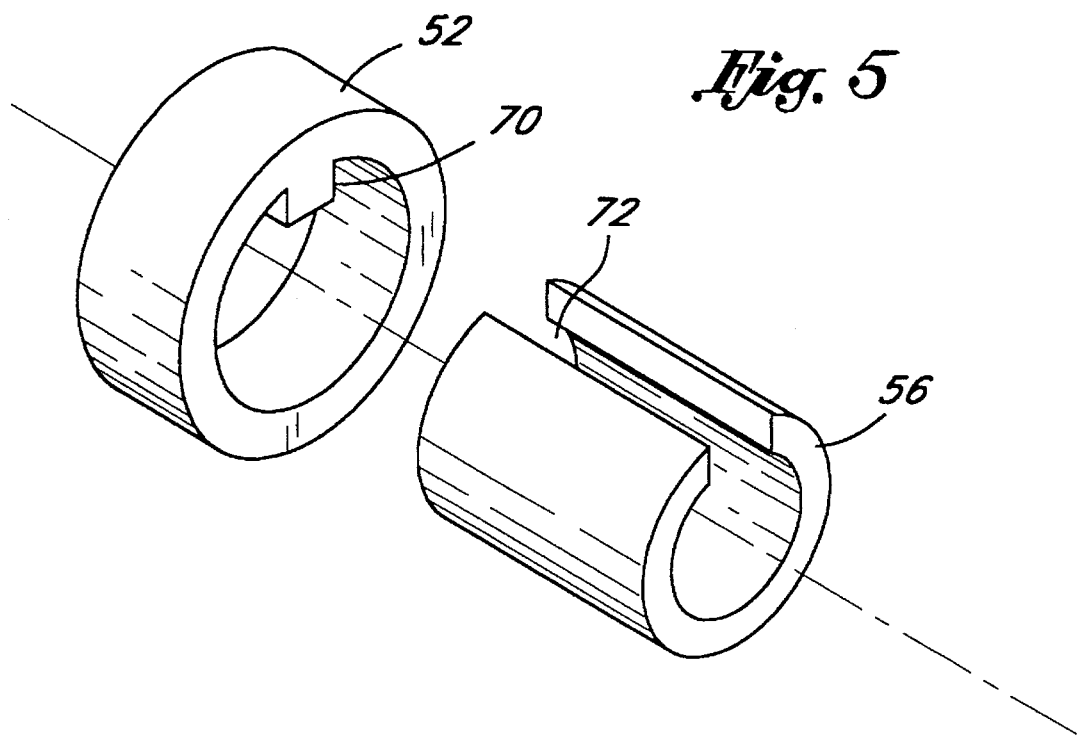
FIG. 5 is an exploded view of a different embodiment of the present invention.
Figure 6:
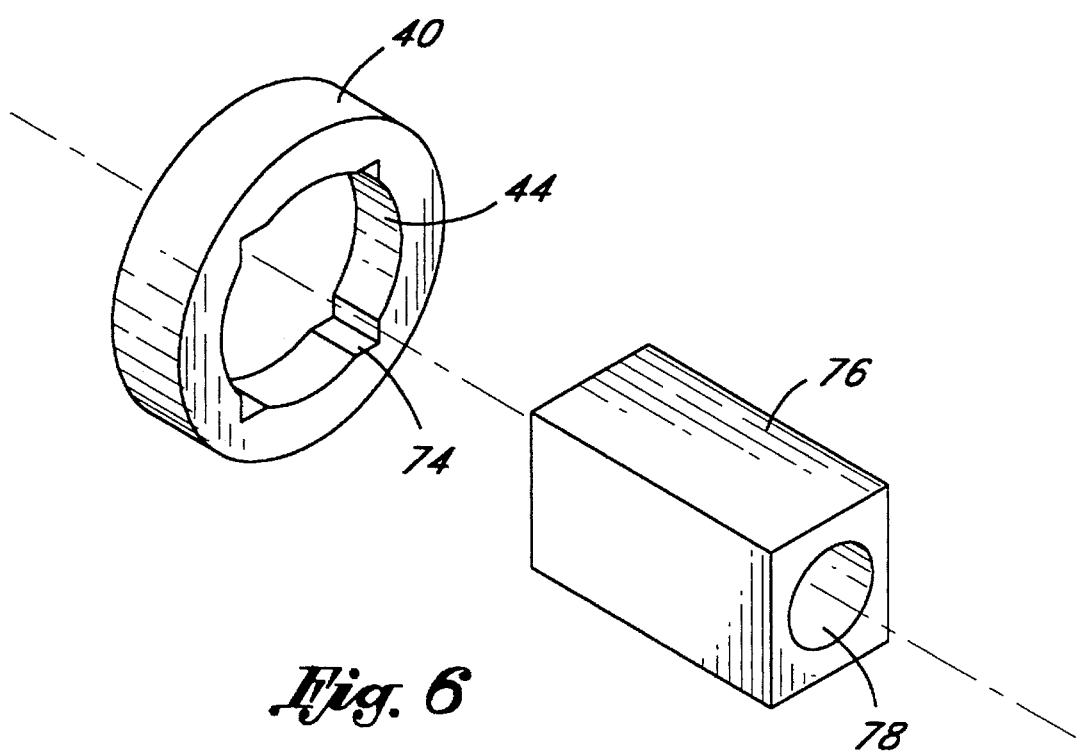
FIG. 6 is an exploded view of another alternate embodiment of the present invention.

Various other constructions of the jockey wheel are certainly feasible, and may be preferred in some applications by some designers. For example, as shown in FIG. 5, the first bushing 52' may be shaped to include a key 70 that interfits with a keyway or slot 72 in the second bushing 56'. Or, as shown in FIG. 6, the inner face 44' of rolling bearing 40' may be eccentrically shaped, such as by including a series of indentations 74, to receive the outer surface of a similarly eccentrically shaped bushing 76. (In this construction, bushing 76 replaces both the first bushing 52 and the second bushing 56.) Bushing 76 includes an inner surface 78 that receives the shaft of bolt 60. By virtue of such constructions, the eccentrically shaped elements of the jockey wheel assembly, such as the key slot, permit the ring gear to move laterally but require the outer race of the rolling bearing to rotate relative to its inner race.

In its preferred embodiment, the invention is an effective mechanism for reducing bicycle drivetrain friction without compromising shifting precision. Rolling bearings significantly reduce friction as compared to plain bearings. Eccentric bushings allow axial motion of the jockey pulley but restrain rotational movement of the inner race of the bearing. Thus the mechanism fulfills all of the objectives for a derailleur jockey wheel.

While presently preferred embodiments of the invention have been shown in the drawings and described in this specification, variations in the construction of the jockey wheel assembly will be apparent to those of ordinary skill in this field. For this reason, the scope of the invention should not be limited to the disclosed embodiment but rather is as set forth in the following claims.

We claim:

1. A jockey wheel for a derailleur of a bicycle, the bicycle having a drive chain, and the jockey wheel including:

a rolling bearing having an inner race adapted to receive a shaft, an outer race and rolling elements between the inner race and outer race;

a ring gear lying within a plane and having an inner opening sized to receive the outer race of the rolling bearing, and an outer periphery including gear projections shaped to mesh with the drive chain of the bicycle, the gear projections defining the plane of the ring gear;

first means attaching the ring gear to the outer race of the rolling bearing; and second means for attaching the inner race of the rolling bearing to the shaft to permit lateral movement of the inner race relative to the shaft but to impede rotational movement of the inner race relative to the shaft, the plane of the ring gear being transverse to the longitudinal axis of the shaft.

2. A jockey wheel as set forth in claim 1 in which the second means prevents rotational movement of the inner race relative to the shaft.

3. A jockey wheel as set forth in claim 2 in which the second means includes at least a first bushing between the inner race and the shaft.

4. A jockey wheel as set forth in claim 3 in which the first bushing has an outer periphery sized to interfit with and slide relative to, but not rotate relative to, the inner race of the rolling bearing, the first bushing also having an inner periphery sized to be received on the shaft.

5. A jockey wheel as set forth in claim 2 in which the second means includes a pair of bushings, a first bushing having an outer periphery sized to interfit with the inner race of the rolling bearing, and an inner periphery, a second bushing having an outer periphery sized to be received within the inner periphery of the first bushing and an inner periphery sized to be received on the shaft, third means preventing rotational movement of the first bushing relative to the inner race of the rolling bearing, and fourth means permitting only lateral sliding movement of the second bushing relative to the first bushing.

6. A jockey wheel as set forth in claim 5 in which the fourth means include a keyway in one of the bushings and a corresponding key in the other of the bushings, the orientation and cooperation of the key and keyway only permitting sliding lateral movement of the second bushing relative to the first bushing in a direction of movement transverse to the plane of the ring gear.

7. A jockey wheel as set forth in claim 5 in which the length of the first bushing along its longitudinal axis is less than the length of the second bushing along its longitudinal axis.

8. A jockey wheel as set forth in claim 7 in which the first bushing includes wiper means shaped to clear contaminants from the outer surface of the second bushing as the first bushing slides along the second bushing.

9. A jockey wheel as set forth in claim 8 in which the wiper means includes tapered edges on the first bushing extending between its inner and outer periphery.

10. A jockey wheel as set forth in claim 5 in which the fourth means include an eccentrically shaped inner periphery of the first bushing and corresponding eccentrically shaped outer periphery of the second bushing, the eccentric shapes of the first and second bushings being such that the bushings can slide laterally, but not rotate, relative to one another.

11. A jockey wheel as set forth in claim 10 in which the length of the first bushing along its longitudinal axis is less than the length of the second bushing along its longitudinal axis.

12. A jockey wheel as set forth in claim 11 in which the edges of the first bushing extend along its inner and outer periphery are shaped to clear contaminants from the outer surface of the second bushing as the first bushing slides along the second bushing.

13. A derailleur assembly for a bicycle having a drive chain, said derailleur assembly including at least one jockey wheel, and said jockey wheel comprising:

a rolling bearing having an inner race adapted to receive a shaft, an outer race and rolling elements between the inner race and outer race;

a ring gear lying within a plane and having an inner opening sized to receive the outer race of the rolling bearing, and an outer periphery including gear projections shaped to mesh with the drive chain of the bicycle, the gear projections defining the plane of the ring gear;

first means for attaching the ring gear to the outer race of the rolling bearing; and second means for attaching the inner race of the rolling bearing to the shaft to permit lateral movement of the inner race relative to the shaft but to impede rotational movement of the inner race relative to the shaft, the plane of the ring gear being transverse to the longitudinal axis of the shaft.

14. A bicycle including a drive chain and a derailleur assembly, the derailleur assembly having at least one jockey wheel, and said jockey wheel comprising:

a rolling bearing having an inner race adapted to receive a shaft, an outer race and rolling elements between the inner race and outer race;

a ring gear lying within a plane and having an inner opening sized to receive the outer race of the rolling bearing, and an outer periphery including gear projections shaped to mesh with the drive chain of the bicycle, the gear projections defining the plane of the ring gear;

first means for attaching the ring gear to the outer race of the rolling bearing; and second means for attaching the inner race of the rolling bearing to the shaft to permit lateral movement of the inner race relative to the shaft but to impede rotational movement of the inner race relative to the shaft, the plane of the ring gear being transverse to the longitudinal axis of the shaft.

* * * * *